(12) United States Patent
Baumann et al.

(10) Patent No.: US 12,741,807 B2
(45) Date of Patent: Sep. 22, 2026

(54) CAPSULE AND PRODUCTION AND USE THEREOF

(71) Applicant: DELICA AG, Buchs (CH)

(72) Inventors: Lia Baumann, Zürich (CH); Philippe Geiger, Wädenswil (CH); Tim Thilla, Weil am Rhein (DE); Caroline Siefarth, Basel (CH); Roland Affolter, Möriken (CH)

(73) Assignee: DELICA AG, Buchs (CH)

( * ) Notice: Subject to any disclaimer, the term of this patent is extended or adjusted under 35 U.S.C. 154(b) by 278 days.

(21) Appl. No.: 18/549,409

(22) PCT Filed: Feb. 18, 2022

(86) PCT No.: PCT/EP2022/054031
§ 371 (c)(1),
(2) Date: Sep. 7, 2023

(87) PCT Pub. No.: WO2022/189120
PCT Pub. Date: Sep. 15, 2022

(65) Prior Publication Data

US 2024/0166428 A1 May 23, 2024

(30) Foreign Application Priority Data

Mar. 9, 2021 (EP) .................................... 21161558

(51) Int. Cl.
*B65D 85/804* (2006.01)
*A23F 3/32* (2006.01)
(Continued)

(52) U.S. Cl.
CPC ............ *B65D 85/8046* (2013.01); *A23F 3/32* (2013.01); *A23F 5/125* (2013.01); *A23F 5/385* (2013.01);
(Continued)

(58) Field of Classification Search
CPC .............. B65D 85/8046; B65D 65/466; B65D 2565/381; A23F 3/32; A23F 5/125; A23F 5/385
(Continued)

(56) References Cited

U.S. PATENT DOCUMENTS 7,048,975 B1 * 5/2006 Tojo .................... B65D 1/0215 428/34.3
8,210,097 B2 * 7/2012 Versini ............... A47J 31/3628 99/302 R
(Continued)

FOREIGN PATENT DOCUMENTS

CN 109071080 A 12/2018
DE 10 2014 000 187 A1 7/2015
(Continued)

OTHER PUBLICATIONS

International Search Report Corresponding to PCT/EP2022/054031 mailed May 16, 2022.
(Continued)

*Primary Examiner* — Dariush Seif
(74) *Attorney, Agent, or Firm* — Secant IP, P.L.L.C.

(57) ABSTRACT

Capsule for preparing a beverage, in particular a hot beverage, comprising a core material in the form of a compact or a bulk material, wherein the core material is a beverage substance, and a shell encasing the core material, the shell comprising a protein.

12 Claims, 1 Drawing Sheet

(51) Int. Cl.
*A23F 5/12* (2006.01)
*A23F 5/38* (2006.01)
*B65D 65/46* (2006.01)

(52) U.S. Cl.
CPC ...... *B65D 65/466* (2013.01); *B65D 2565/381* (2013.01)

(58) Field of Classification Search
USPC .............................................................. 426/77
See application file for complete search history.

(56) References Cited

U.S. PATENT DOCUMENTS 8,960,489 B2 * 2/2015 Footz ................. B65D 85/8061 220/796
9,422,104 B2 * 8/2016 Vanni ................. B65D 85/8046
10,913,832 B2 * 2/2021 Friedrich ............... B65D 75/08
11,365,046 B2 * 6/2022 Nickel .................. B65B 29/022
2005/0220824 A1 * 10/2005 Teckoe .................. B30B 11/027 264/319
2009/0304776 A1 * 12/2009 Shantha ................. A61K 31/79 424/443
2010/0313766 A1 * 12/2010 Suggi Liverani ... A47J 31/0673 99/295
2011/0212225 A1 * 9/2011 Mariller ............... B65D 65/466 426/80
2011/0271844 A1 * 11/2011 Mariller ............... B65D 65/466 426/77
2012/0308691 A1 * 12/2012 Alvarez .................. A47J 31/22 426/433
2013/0136843 A1 * 5/2013 Blanc ...................... A23F 5/125 100/35
2014/0332547 A1 * 11/2014 Footz ................. B65D 85/8061 220/796
2015/0151903 A1 * 6/2015 Bartoli ............... B65D 85/8064 206/0.5
2015/0336736 A1 * 11/2015 Cabilli ................. B65D 65/466 264/494
2017/0008694 A1 * 1/2017 Andreae .............. B65D 65/466
2017/0334624 A1 * 11/2017 Cabilli ................. B65D 65/466
2018/0093821 A1 * 4/2018 Cabilli ................. B65D 65/466
2018/0206515 A1 * 7/2018 Nickel .................. C08B 31/003
2019/0016528 A1 * 1/2019 Kuhl .................... B65D 65/466
2019/0225412 A1 * 7/2019 Cabilli ............... B65D 85/8043
2022/0063899 A1 * 3/2022 Krüger ............... B65D 85/8064
2023/0189836 A1 * 6/2023 Nickel ................. C09D 101/02 426/89
2023/0277422 A1 * 9/2023 Flammer ................ A61K 8/062
2024/0166428 A1 * 5/2024 Baumann ........... B65D 85/8046

FOREIGN PATENT DOCUMENTS

EP 2 106 375 B1 10/2009
EP 3 115 316 A1 1/2017
EP 3 225 566 A1 10/2017
KR 10-2018-0007983 A 1/2018
WO 2010/006979 A1 1/2010
WO 2015/177591 A2 11/2015
WO 2020/114995 A2 6/2020

OTHER PUBLICATIONS

Written Opinion Corresponding to PCT/EP2022/054031 mailed May 16, 2022.
Canadian Official Action issued in 3,209,666 dated Feb. 5, 2026.

* cited by examiner

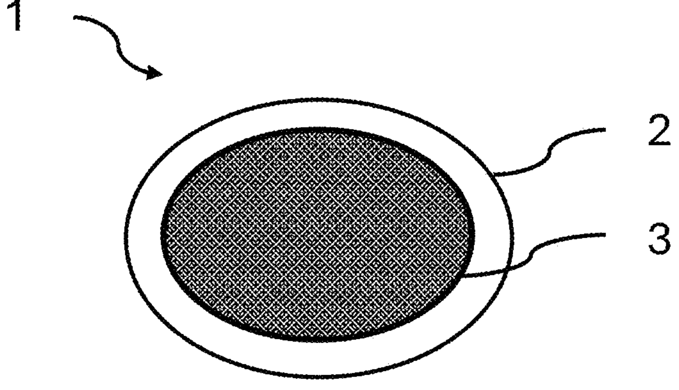
1
2
3

CAPSULE AND PRODUCTION AND USE THEREOF

The present invention relates to capsules comprising an ingredient suitable for the preparation of a beverage, in particular a hot beverage, and to the preparation and use thereof.

The provision of a luxury food such as coffee in capsule form is well known. However, the materials such as plastics or aluminum (cf. e.g. EP-2 106 375 A2) that are usually used as materials of the shell have the disadvantage that they are not sustainable.

In DE 10 2014 000187 B4, it was proposed to coat a compact for the production of, for example, coffee with a coating material consisting of a biodegradable layer, said layer being a polysaccharide or a derivative thereof in combination with a polyol spacer and an associated cross-linker.

EP-3 115 316 B1 describes a similar capsule for the production of, for example, coffee, in which the crosslinked polysaccharide in the material of the shell was obtained without the use of a polyol spacer. Specifically, calcium alginate is mentioned as material of the shell.

In US-2013/0136843 A1, it is proposed to coat a core of coffee powder with a shell of compacted coffee.

The aforementioned prior art solutions are not yet optimal with regard to the provision of a capsule for the preparation of a hot beverage under the most economical, ecologically compatible and manufacturing reasons. Furthermore, in many cases the stability of the capsule and/or the oxygen barrier of the capsule shell are deficient.

It was the objective of the present invention to provide a capsule for preparing a beverage, in particular a hot beverage, which overcomes the disadvantages of the prior art.

This objective is solved by the subject matter of the independent claims of the present application.

The sole figure schematically shows an example capsule according to the invention with a core material and a shell.

More specifically, the present invention relates to a capsule 1 for the preparation of a beverage, in particular a hot beverage, comprising

- a core material 2 in the form of a compact or a bulk material, wherein the core material 2 is a beverage substance, in particular selected from the group consisting of coffee powder, tea, cocoa, drinking chocolate, milk powder, vegan milk substitute powder, instant coffee, coffee substitute products, and dry soup, and combinations thereof, and
- a shell 3 encasing the core material 2, the shell 3 comprising a protein.

According to the present invention, the core material is selected from the group consisting of coffee powder, tea, cocoa, drinking chocolate, milk powder, vegan milk substitute powder, instant coffee, coffee substitute products and dry soup and combinations thereof. Such core materials are well known and need not be discussed in detail here. Solid and/or swellable materials have been found to be advantageous over soluble materials in that the material does not dissolve during beverage preparation and the capsule substantially retains its shape until beverage preparation is complete.

The core material may be in the form of a compact or bulk material. The core material in the form of bulk material is suitable for conventional filling of a substantially rigid shell. Equally, however, the bulk material may also be packaged in a flexible shell, for example similar to a tubular bag. The bulk material is then held together by the shell.

According to the present invention, a "compact" is understood to be a core material that has been compressed under pressure. Providing the core material of the capsule as a compact is particularly advantageous if the core material is sheathed by dipping, coating or spraying with the material of the shell so that the core material does not disintegrate during the sheathing process. The core material therefore preferably has a certain strength. This can preferably be achieved by compressing the core material with a compression pressure in the range of 1-100 MPa, preferably 5-50 MPa. The resulting compact with the shell then preferably has a strength in the range of 10-300 N, preferably 50-250 N, particularly preferably 75-225 N.

The compression pressure to be applied to produce the compact depends on the properties of the core material, in the case of coffee powder, for example, on the grind, degree of roasting and moisture content of the powder. In the case of coffee powder in particular, it can be observed that powder with a smaller fat or oil content, e.g. decaffeinated coffee powder, requires a higher compression pressure in order to achieve a stable compact.

The strength of the compact is determined by clamping the compact between two plates and determining the force required to crush the compact. This method is also described in WO 2008/123775 A1, p. 3.

The capsule can be manufactured in the usual way by coating a compact of the desired core material with material of the shell in the conventional way, in particular by dipping, coating or spraying.

The material of the shell to be used according to the invention comprises a protein. A shell made of a protein exhibits a high natural barrier to oxygen. Accordingly, the durability of the core material can be increased. Furthermore, with a material of the shell comprising protein, mechanical properties of the shell can be modified in a wide range according to the requirements. For example, the breaking strength of the capsule can be adjusted. Furthermore, the visual appearance, in particular the color, gloss, homogeneity of the surface, can be adjusted depending on the choice of protein used. Likewise, the protein can be used as a carrier of active substances, such as antimicrobial agents.

The material of the shell is preferably designed in such a way that it does not dissolve during beverage preparation, in particular during the preparation of a hot beverage. During extraction with water at up to 100° C. and an extraction time of up to 3 min, the shell thus retains a stable shape so that the capsule can be ejected or removed from a beverage preparation machine without difficulty after beverage preparation.

The shell may have a protein content of at least 10% w/w based on dry matter. In particular, in the case of a shell consisting of an essentially pure protein film, optionally with the addition of plasticizers, the protein content can preferably be between 30% to 100% w/w, particularly preferably between 50% to 80% w/w. Thus, a very high oxygen barrier can be achieved. Furthermore, mechanical and visual properties can be easily varied. In the case of a shell essentially consisting of an alginate protein film, optionally with the addition of plasticizers and/or cellulose, the protein content can preferably be between 10% to 60% w/w, particularly preferably between 10% to 40% w/w. Such a shell is much easier to apply than an essentially pure protein film.

The protein of the shell may be selected from the group consisting of animal proteins, such as whey protein caseins, gelatin, keratins, egg protein (egg albumin), silk fibroin, proteins from yeasts, and plant proteins, such as potato protein, corn protein, pea protein, rice protein, soy protein, lupin protein, wheat protein, canola protein, pumpkin protein, peanut, almond, nut protein (for example, pecan, walnut, hazelnut, macadamia, cashew), lentil protein, chickpea protein, bean protein, quinoia protein, amaranth protein, sunflower seed protein, oat protein, hemp protein, and combinations of different animal and/or plant proteins. Depending on the protein used, the processing is different and also the properties of the shell and, accordingly, the capsule can be different.

Pea proteins, for example, are very easy to process and readily available, as they are already used in some foods. Pea protein is also relatively inexpensive and hardly genetically modified. Pea protein is not considered an allergen and is approved for both vegetarian and vegan diets.

Whey protein is readily available and interesting in price, it is an industrial by-product. Whey proteins can be used to obtain a casing with an attractive appearance. Dosing in the process is possible in small quantities. A disadvantage is the allergenicity of whey proteins. It is an animal product and is therefore not suitable for the vegan diet.

The advantage of corn protein is the excellent stability of the shell obtained with it. Corn can bond with the core material, especially coffee. In addition, corn protein is not soluble in water and accordingly difficult to apply. Corn protein is of plant origin, but may be genetically modified.

The protein of the shell can be crosslinked. Crosslinking influences the mechanical properties of the shell. In particular, the stability of the shell is improved. However, it is also conceivable that a non-crosslinked or non-crosslinking protein is used.

The shell of the capsule can be composted. This means that after extraction of a beverage, the capsule does not have to be disposed of with household waste but can be composted. Both the used beverage substrate and the capsule shell are returned to the biological cycle.

"Compostable" is understood to mean that the material is at least home compostable according to the certification schemes NF T 51-800:2015-11-14 (Plastics—Specifications for plastics suitable for home composting) and AS 5810:2010 (Biodegradable plastics—Biodegradable plastics suitable for home composting). This means biodegradation of at least 90% of the material with release of $CO_2$ within 12 months at a temperature of 25±5° C. and fragmentation (disintegration) of at least 90% of the material within 6 months at a temperature of 25±5° C.

The shell can be composed of 1-20 layers, preferably 2-10 layers and particularly preferably 2-5 layers, whereby the layers can have the same protein with the same or different content or different proteins with the same or different content. Due to the multilayer structure, the properties, in particular the mechanical properties (for example, impermeability, swelling capacity, deformability), of the shell can be modified and adjusted in a wide range.

It is conceivable that at least one or more layers are composed without protein and comprise, in particular, at least one polysaccharide, preferably sodium alginate or calcium alginate. In this case, a layer comprising a protein may be arranged between two layers without protein. By using layers without protein and their sequence, even further modifications of the properties of the shell are possible.

The capsule according to the invention can have different shapes. A variety of such shapes are already known in the prior art for corresponding capsules in the relevant technical field. For example, the capsule may have the shape selected from the group comprising cube, cuboid, prism, pyramid, truncated pyramid, cylinder, cone, truncated cone, torus, sphere, ellipsoid, coffee bean. Preferably, the capsule is spherical. The capsule can be optimally adapted to a machine for preparing a beverage or to the corresponding preparation process.

The capsule according to the invention has a core-shell structure, i.e. a core of one material (core material) is surrounded by a shell of another material (material of the shell). The shell may be formed without a seam if it is not assembled from multiple pieces (such as hard capsules). However, the shell may also be formed from two or more parts. The shell may have one or more seams.

The shell may adhere to the core material or loosely surround the core material.

The shell can have a weakening line at which it is easier to open the shell. Such a weakening line is advantageous if the shell in a beverage preparation machine is pierced on one side for the introduction of a liquid and is to be opened at another point for the discharge of the liquid by its internal pressure. The weakening line may be formed by a seam.

Another aspect of the present invention relates to a method of manufacturing a capsule, in particular according to the preceding description, comprising the steps of:

(a) Providing a core material selected from the group consisting of coffee powder, tea, cocoa, drinking chocolate, milk powder, vegan milk substitute powder, instant coffee, coffee substitute products, and dry soup, and combinations thereof, b) Compacting the core material into a compact, c) providing a system, in particular an aqueous system, comprising a protein, in particular selected from the group consisting of plant proteins, animal proteins and proteins from yeasts and combinations thereof, as explained above for the capsule, d) Application of the system to the surface of the compact, in particular by dipping, coating or spraying, e) Drying of the coated compact.

The provision of a system, in particular an aqueous system, comprising a protein can be carried out in a customary manner by mixing a solution, in particular an aqueous solution, with the corresponding protein powder. The mixing may be assisted or enabled by customary measures such as stirring, heating, adjusting the pH range to increase the solubility of the protein powder, for example by adding an acid or base, or a combination of such measures. The aqueous system can additionally be enriched with at least one polysaccharide.

In this context, a system is understood to be not only an aqueous system (i.e. a system comprising exclusively water as solvent). It is equally conceivable that the system is a solvent mixture of water and a water-miscible solution, for example of low-chain (e.g. C1-8), physiologically acceptable alcohol, such as ethanol. Similarly, it is conceivable that a coffee extract, for example from a brewed coffee or from an instant coffee, is used instead of water as solvent to create the aqueous system.

In this way, a system is provided in the form of a solution, in particular an aqueous solution, with a concentration of protein between 1% and 40% w/w, preferably between 1% and 35% w/w, more preferably between 1% and 30% w/w, based on the total weight of the system.

According to the invention, preferably a system is provided in the form of a solution, in particular an aqueous solution, with a concentration of pea protein between 1% and 20% w/w, preferably between 5% and 15% w/w, particularly preferably between 8% and 11% w/w, based on the total weight of the system.

Alternatively, a system is provided in the form of a solution, in particular an aqueous solution, with a concentration of corn protein between 1% and 30% w/w, preferably between 10% and 30% w/w, more preferably between 20% and 30% w/w, based on the total weight of the system.

Further alternatively, a system is provided in the form of a solution, in particular an aqueous solution, having a concentration of whey protein between 1% and 20% w/w, preferably between 5% and 15% w/w, more preferably between 8% and 11% w/w, based on the total weight of the system.

Further alternatively, a system is provided in the form of a solution, in particular an aqueous solution, having a concentration of potato protein between 1% and 20% w/w, preferably between 2% and 18% w/w, more preferably between 4% and 17% w/w, based on the total weight of the system.

A system can be provided in the form of a solution, in particular an aqueous solution, containing alginates, with a concentration of protein between 0.1% and 5% w/w, preferably between 0.5% and 4% w/w, more preferably between 1% and 3% w/w, based on the total weight of the system.

According to a preferred embodiment, softened or demineralized water is used for the step of providing an aqueous system comprising a protein.

The system may include additional additives to modify the properties of the material of the shell to be applied. For example, plasticizers such as glycerol, sorbitol, polyethylene glycol (PEG) or a combination of these plasticizers may be mentioned. Such additives are usually added to the aqueous system in amounts of 0.1 to 15% w/w, preferably 0.2 to 15% w/w and particularly preferably 0.5 to 15% w/w, based on the total weight of the system.

The system thus provided can be applied to the surface of the compact in a conventional manner, in particular by dipping, coating or spraying.

The coating of the desired core material with the material of the shell can be achieved by immersing the compact in the system described above. For example, the compact can be introduced into the system via a suitable suspension, where it remains for a desired time, for example for 1 to 60 s, preferably 2 to 30 s, particularly preferably 3 to 10 s. Other methods of coating in an immersion bath, for example with a fixed position in the immersion bath or rolling locomotion through the immersion bath, are conceivable.

The step of applying the aqueous system to the surface of the compact can be carried out repeatedly with the same system or different systems, in particular aqueous systems. Thus, 1-20 layers, preferably 2-10 layers and particularly preferably 2-5 layers, can be produced on the surface of the compact.

The step of applying the aqueous system to the surface of the compact can also be carried out repeatedly with different systems, especially aqueous systems, without protein. Thus, the properties of the shell can be further modified.

The step of drying the coated compact can be repeated after each individual application of an aqueous system or after a certain number of applied aqueous systems.

When applying multiple layers, the type of coating process can be the same in each case, or alternatively, different coating processes can be used.

The coated compact is subjected to a drying process after the last coating step and/or between one or more individual coating steps. This drying can be carried out in a conventional manner. According to the invention, drying is preferably carried out in an air stream, by convection drying and/or by contact drying. Examples include tray drying with hot air, IR drying (drying by irradiation with IR radiation) and microwave drying (drying by irradiation with microwaves). The temperatures used for this purpose are usually in the range of 10 to 40° C. at normal pressure, preferably 15 to 25° C., usually below 50° C.

The process steps of coating and drying together usually require a duration of 2 min to 20 min per layer, preferably 5 min to 10 min. However, depending on the type of layers applied and their number, a duration of 20 min to 240 min, preferably 40 min to 80 min, may also be necessary.

According to one embodiment of the present invention, the coating of the compact and the subsequent drying can be carried out in one process step if the coating is carried out in a known manner by a spray coating in a fluidized bed process. The temperatures applied for this purpose are usually in the range of 25 to 80° C.

Compression of the core material can be performed with a compression pressure in the range of 1-100 MPa, preferably 5-50 MPa.

Another aspect of the invention relates to a capsule for preparing a beverage obtainable by a method as previously described.

The capsule according to the invention can be used to prepare a beverage, in particular a hot beverage selected from the group comprising coffee, coffee substitute, tea, cocoa, drinking chocolate, milk, vegan milk or soup, or combinations thereof.

According to the invention, it is preferred that the beverage is prepared by extracting the capsule with an especially hot liquid selected from the group consisting of water, milk, coffee extract or combinations.

Corresponding preparation processes and devices for this purpose are known from the prior art.

A system for preparing a beverage comprises a capsule as described above and a machine for receiving and extracting the capsule with a liquid selected from the group consisting of water, milk, coffee extract or combinations thereof, in particular a hot liquid.

For each of the examples given below, a spherical compact for coffee preparation was prepared by compacting 6.2 g of roasted ground coffee powder at 30 MPa in a press. The coffee powder had a moisture content of 3.5%. The mean particle size of the coffee powder was 400 μm+100 μm. In all examples, the OTR of the shell was measured to be less than 5 $cm^3/(m^2*d*1.0$ bar). The surfaceadjusted Oxygen Transmission Rate (OTR) indicates the amount of oxygen diffusing through the shell per unit area and time. The preparation of an aqueous solution and the coating of the compact are described in the respective example.

EXAMPLE 1 (PROTEIN+GLYCEROL ONLY): CORN

A solution of 23.8% demineralized water, 58.8% ethanol and 17.5% w/w corn protein (CPI) (FloZein F4400C Series, FloZein Products USA) was prepared. The CPI solution was heated at 40° C. for 30 min while mixing at 50 rpm. The solution was then mixed to room temperature with 66% glycerol (based per gram of CPI).

The pellet was immersed in the aqueous CPI solution for 6 s and dried for approx. 6 min at 25° C. in an air stream. Subsequently, the compact was immersed in the CPI solution for a second time for 6 s and then dried at 25° C. for 15 min.

After drying, the breaking strength of the coated ball was 103 N.

Example 2 (Protein+Glycerol Only): Pea

An aqueous solution of demineralized water and pea protein isolate (PPI) concentration (PDS Empro E 86 HV, Emsland Group, Germany) of 10% w/w was prepared. The PPI solution was heated at 90° C. for 30 minutes while mixing at 50 rpm. The solution was then mixed with 60% glycerol (based per gram of PPI) at room temperature.

The compact was immersed in the aqueous PPI solution for 6 s and dried for approx. 6 min at 25° C. in an air stream. Subsequently, the compact was immersed in the PPI solution for a second time for 6 s and then dried at 25° ° C. for 15 min.

After drying, the breaking strength of the coated ball was 50 N.

Example 3 (Protein+Alginate+Glycerol): Whey

An aqueous solution of demineralized water and a concentration of whey protein isolate (WPI) BiPro 9500, Agropure Ingredients Inc, USA) of 10% w/w was prepared. The WPI solution was heated at 90° C. for 20 min while mixing at 50 rpm.

Subsequently, an aqueous solution of demineralized water and sodium alginate (VIVAPUR Sodium Alginate, medium viscosity, JRS, Germany) was prepared. A system was prepared in the form of an aqueous solution with a concentration of sodium alginate of 1.7% w/w based on the total weight of the aqueous solution.

The WPI solution and the alginate solution were then mixed at a ratio of ⅟9 to obtain a solution containing 1% protein.

The solution was then mixed with 2% glycerol (based on the total weight of the aqueous solution).

The compact was immersed in the aqueous WPI alginate solution for 6 s and then immersed in a calcium chloride solution with the concentration of 5% w/w for 10 s. The coffee compact was then dried at 25° C. in an air stream. Subsequently, the compact was immersed a second time for 6 s in the WPI alginate solution and then immersed for 10 s in a calcium chloride solution with the concentration of 5% w/w. The coffee compact was then dried for 15 min at 25° C.

After drying, the breaking strength of the coated ball was 179 N.

Example 4 (Protein+Alginate+Sorbitol): Pea

An aqueous solution of demineralized water and pea protein isolate (PPI) concentration of 10% w/w was prepared. The protein solution (PDS Empro E 86 F30, Emsland Group, Germany) was heated at 90° C. for 20 minutes while mixing at 50 rpm.

Subsequently, an aqueous solution was prepared from demineralized water, sodium alginate (VIVAPUR Sodium Alginate, medium viscosity, JRS, Germany) and the protein solution. A system was prepared in the form of an aqueous solution with a concentration of sodium alginate of 1.7% w/w based on the total weight of the aqueous solution.

The PPI solution and the alginate solution were then mixed in a ratio of 3/7 to obtain a solution containing 3% protein.

The solution was then mixed with 3.5% sorbitol (based on the total weight of the aqueous solution).

The compact was immersed in the aqueous PPI-alginate solution for 6 s and then immersed in an aqueous calcium chloride solution with the concentration of 5% w/w for 10 s. Then, the coffee compact was dried at 25° C. in an air stream. Subsequently, the compact was immersed a second time for 6 s in the PPI alginate solution and then immersed for 10 s in a calcium chloride solution with the concentration of 5% w/w. The coffee compact was then dried for 15 min at 25° C.

After drying, the breaking strength of the coated ball was 168 N.

The invention claimed is:

1. A method of manufacturing a capsule comprising the steps of:

a) Providing a core material selected from the group consisting of coffee powder, tea, cocoa, drinking chocolate, milk powder, vegan milk substitute powder, instant coffee, coffee substitute products, and dry soup, and combinations thereof, b) Compacting the core material into a compact, c) Providing a system comprising a protein, d) Applying the system to a surface of the compact to obtain a coated compact, e) Drying of the coated compact.

2. The method according to claim 1, wherein step d) is carried out repeatedly with the same system or different systems, to produce 1-20 layers on the surface of the compact.

3. The method according to claim 2, wherein step e) is carried out repeatedly with the same or different system to produce 1-20 layers.

4. The method according to claim 1, wherein step d) is carried out repeatedly with a different system, without protein.

5. The method according to claim 4, wherein step e) is carried out repeatedly with different systems without protein.

6. The method according to claim 1, wherein compressing the core material is performed with a compression pressure in the range of 1-100 MPa.

7. The method according to claim 1, wherein the system additionally comprises a plasticizer.

8. The method according to claim 7, wherein the plasticizer is glycerol and/or sorbitol and/or polyethylene glycol.

9. The method according to claim 1, wherein step e) is carried out in air stream, by convection drying and/or contact drying.

10. The method according to claim 1, wherein the system is provided in the form of an aqueous solution, with alginates, having a concentration of protein between 0.1% and 5.0% w/w based on the total weight of the aqueous system.

11. A capsule for preparing a beverage obtainable by a method according to claim 1.

12. The method according to claim 1, wherein the protein in step c) is selected from the group consisting of animal proteins, plant proteins and proteins from yeasts and combinations of different animal and/or plant proteins and/or proteins from yeasts.

* * * * *